United States Patent [19]

Dispennett et al.

[11] 4,430,878
[45] Feb. 14, 1984

[54] METHOD FOR FORMING THE STITCH FORMING AREA OF A SEWING MACHINE THROAT PLATE

[75] Inventors: David Dispennett; Robert Zorn, both of Chicago, Ill.

[73] Assignee: Union Special Corporation, Chicago, Ill.

[21] Appl. No.: 315,335

[22] Filed: Oct. 26, 1981

[51] Int. Cl.³ ............................................. B21D 35/00
[52] U.S. Cl. ........................................ 72/340; 72/379; 29/557; 112/260
[58] Field of Search ................. 72/340, 379, 352, 324, 72/342, 341; 29/163.5, 557; 112/260

[56] References Cited

U.S. PATENT DOCUMENTS

| | | | |
|---|---|---|---|
| 110,773 | 1/1871 | Miller | 72/352 |
| 1,497,530 | 6/1924 | Mortensen | 72/340 |
| 2,182,067 | 12/1939 | Bruecker | 72/341 |
| 2,364,235 | 12/1944 | Muros | 72/342 |
| 2,807,970 | 10/1957 | Dorman | 72/340 |
| 3,435,654 | 4/1969 | Papst | 72/340 |
| 4,184,242 | 1/1980 | Petrie | 72/340 |

FOREIGN PATENT DOCUMENTS 841436  6/1952  Fed. Rep. of Germany ........ 72/340

OTHER PUBLICATIONS

Brezler, R. A., Jr., "Making Sense of Worm Rolling", from *American Machinist*, McGraw-Hill, Inc., Dec., 1980, pp. 6, 129–140.

*Primary Examiner*—Daniel C. Crane
*Attorney, Agent, or Firm*—John W. Harbst; John A. Schaerli

[57] ABSTRACT

This invention relates to a cold forming process wherein a consistent stitch tongue profile is swaged into a planar throat plate blank. Thereafter, excess material resulting from the cold forming process is removed and the required needle holes and thread slots are provided in the blank.

6 Claims, 17 Drawing Figures

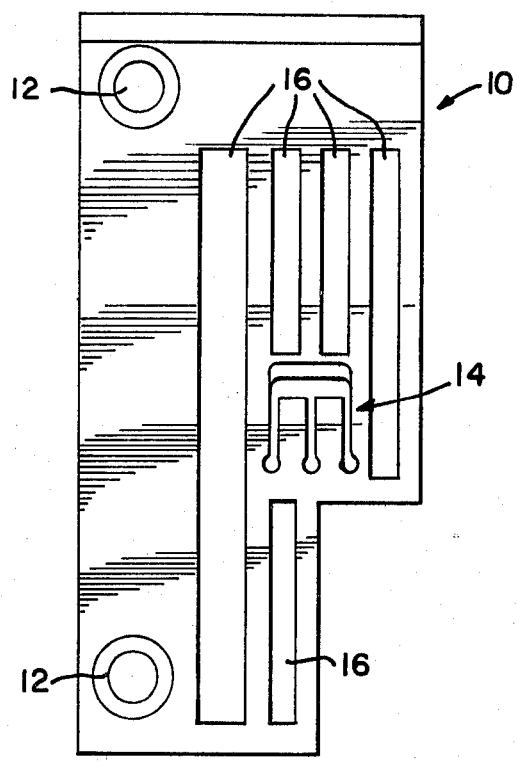
Fig-1-
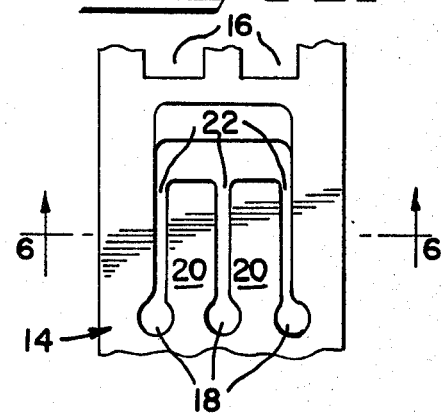
Fig-2-
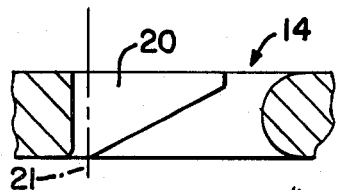
Fig-3-
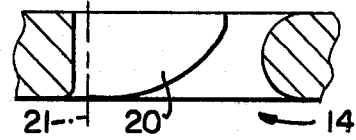
Fig-4-
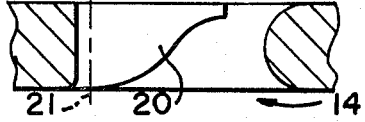
Fig-5-
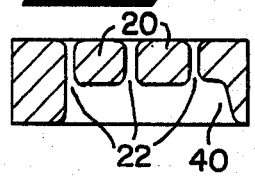
Fig-6-

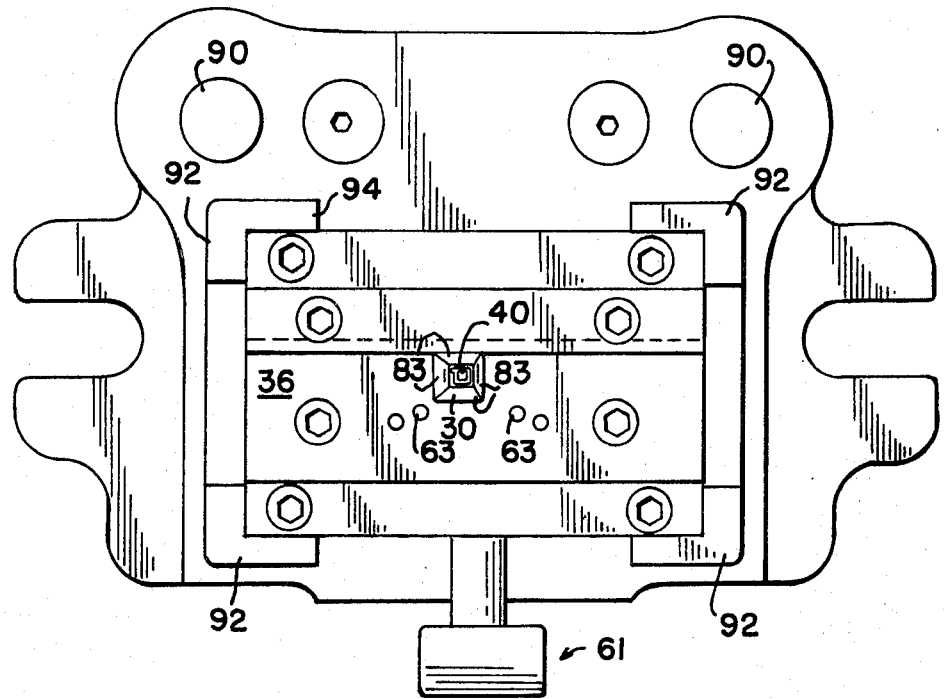
FIG_9_
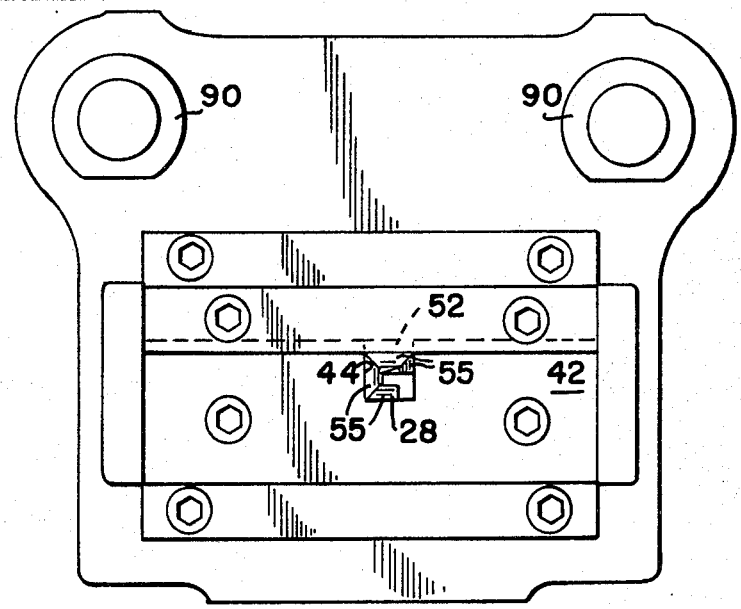
FIG_10_

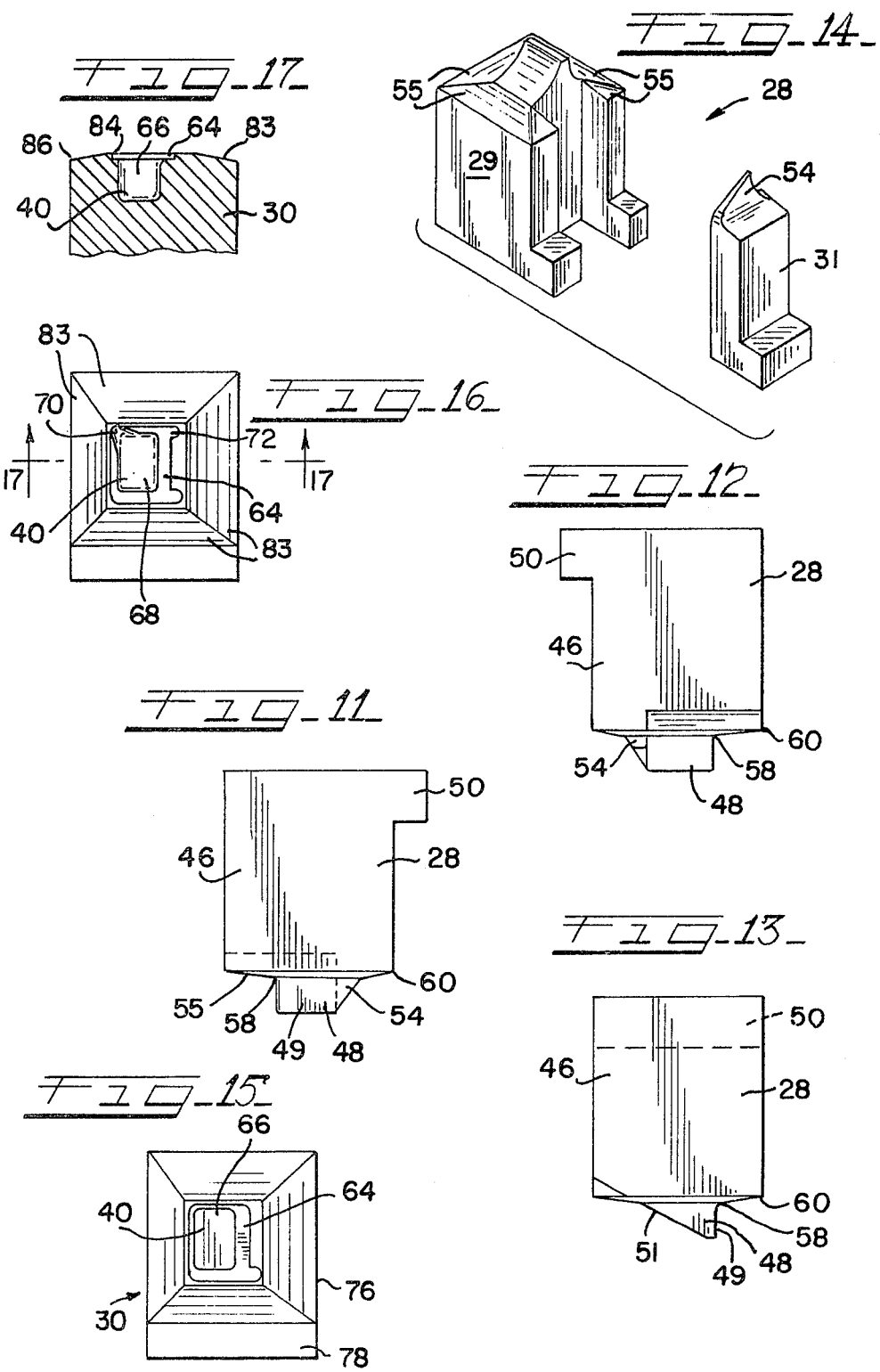

METHOD FOR FORMING THE STITCH FORMING AREA OF A SEWING MACHINE THROAT PLATE

FIELD OF THE INVENTION

This invention relates to sewing machines and, more particularly, to a method and apparatus for fabricating the stitch forming area of sewing machine throat plates.

BACKGROUND OF THE INVENTION

One of the most important areas contributing to the overall performance of a sewing machine is the stitch tongue area of the sewing machine throat plate. Because the stitch tongue area of the throat plate is intimately involved with the formation of the stitch, its concise fabrication is paramount to the overall performance of the machine. Also, to allow continued and effective use of a sewing machine in the sewing plant, throat plates must be readily replaceable. Thus, the thousands of like throat plates being produced and used every year must also be consistent to allow interchangeability.

To meet the stringent requirements of conciseness and consistency previously required tedious hours of hand labor in producing the throat plate. Even with hand worked throat plates, consistency between parts remained a difficult standard to meet. That is, one plate could vary from the next depending upon the experience and expertise of the craftsperson producing the plate. Recently, some manufacturers have turned to alloyed steels in an effort to improve the durability of the throat plates. Although alloyed steels may produce stronger throat plates, there are a number of drawbacks associated with throat plates made from alloyed steels. Alloyed steels require increased machining time to produce the desired stitch tongue. Also, alloyed steels result in increased tool wear used in forming the throat plate. Even though more durable, the requirements of consistency and conciseness are not guaranteed by using alloyed steels.

SUMMARY OF THE INVENTION

In view of the above, and in accordance with the present invention there is provided a method and apparatus for forming the stitch tongue area of the sewing machine throat plate with consistency and conciseness even with alloyed steel. The problem of overcoming all of the heretofore mentioned constraints is essentially solved by using a cold forming process for forming the stitch tongue. From the economic side, cold forming the stitch tongue makes sense because it permits greatly increased productivity per worker-hour. Also, the disclosed method saves a significant amount of time and energy compared with the heretofore known method of fabricating the throat plates.

With the present invention, a planar throat plate blank is positioned in a power press between forming punch and a complimentary arranged die. The forming punch, having a mirror image of the desired stitch tongue profile, is progressively pressed against the blank with an amount of force adequate to permanently displace the blank material in a manner such that it conforms to the punch form. The material is forced to flow into the intricacies of the punch whereby causing reorientation and elongation of the grains in a direction generally parallel to the profile of the forming punch and sets up residual compressive stresses which help to increase the strength of the stitch tongue. A suitably formed cavity in the die having a series of pressure points control the displacement of material during the swaging process. The material initially displaced into the cavity has a "dowelling effect" on the position of the plate whereby preventing lateral shifting thereof. Thus, the stitch tongue profile is located with consistency on every plate produced with this method. Because the apparatus employed for forming the stitch tongue profile has a positive stop, each plate produced has a quality of conciseness required in the stitch forming area regardless of the blank's thickness. Furthermore, this unique method of forming the stitch tongue profile is effective on a wide range of alloyed materials. Having impressed the stitch tongue profile in the blank, it is then sized and the appropriate number and size of needle holes and thread slots are provided therein.

There are a number of advantages which are inherent with the instant process. Cold forming is a relatively high speed process that can greatly increase production rates. The life of a die, especially if made from carbide, is usually much longer than that of cutting tools. In most cases, the power required to cold form a stitch tongue profile is less than the total power required to produce a stitch tongue profile through conventional means. A stitch tongue profile produced under the instant method exhibits improved physical properties. At the same time, the dimensional tolerances of the finished stitch tongue remains more uniform or consistent during the life of the punch and die. Moreover, this cold forming chipless machining process produces a stitch tongue having a surface quality superior to that of any hand machining operation. The surfaces produced by the instant invention are free from tears, chatter, and cutter marks that could serve as focal points of stress and, therefore, starting points for fatigue failure. The form of the punch is faithfully and consistently reproduced on the workpiece. Furthermore, the profile of practically any shaped stitch tongue is easily achieved simply by changing dies. Thus, there may be less down time due to tool replacement and/or wear.

It is therefore a primary object of this invention to provide a unique method of fabricating the stitch tongue profile of sewing machine throat plates with consistency and conciseness regardless of the material used.

Another object of this invention is to provide a method of fabricating the stitch tongue area of a sewing machine throat plate more economically and with more accuracy than conventional means.

Another object of this invention is to provide a method of fabricating a stitch tongue profile quicker, cheaper and with increased strength.

Another object of this invention is to provide a cold forming method of fabricating the stitch tongue of a sewing machine throat plate with a surface finish superior to that achieved with conventional means.

Yet another object of the present invention is to provide a cold forming method of fabricating any stitch tongue profile in a sewing machine throat plate simply by switching or changing tools.

Still another object of the present invention is to provide a method and apparatus for cold forming the stitch tongue area in a sewing machine throat plate wherein the displacement of material is controlled in a predetermined manner whereby minimizing wasted parts.

Yet another object of this invention is a method of forming a stitch tongue profile that can be precisely measured before extensive operations have been performed.

Further objects and advantages of this invention will become apparent from the description now to follow of the preferred embodiment thereof shown by way of example in the accompanying drawings, in which;

FIG. 1 is a top plan view of a standard sewing machine throat plate capable of being produced by the instant invention;

FIG. 2 is an enlarged top plan view of the stitch forming area of the throat plate shown is FIG. 1;

Figure 7:
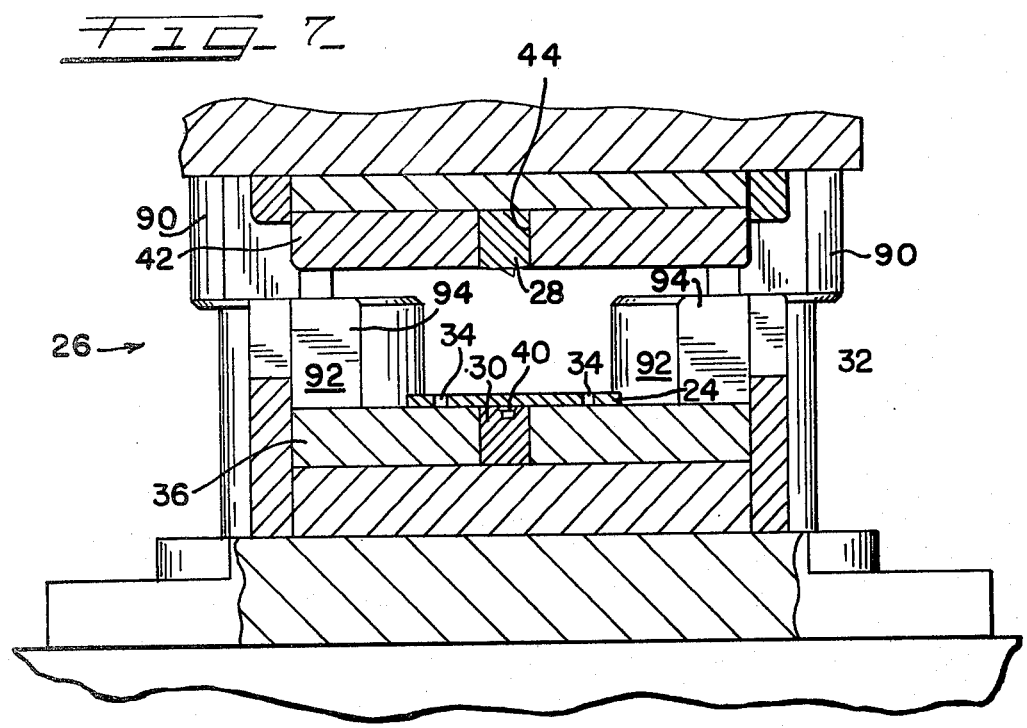
Figure 8:
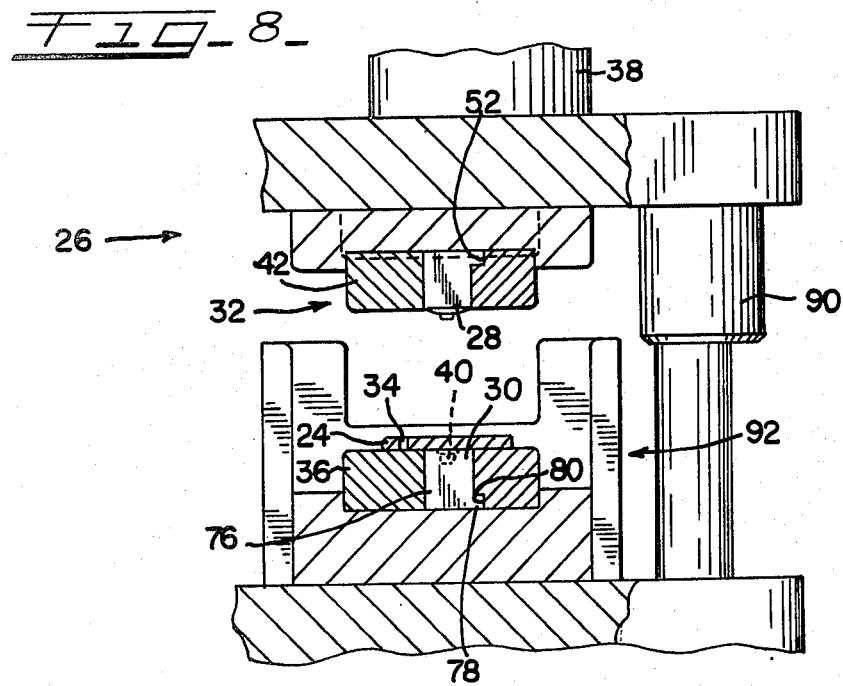

FIGS. 3, 4, and 5 illustrate a few of the stitch tongue profiles which can be achieved with the instant method and apparatus;

FIG. 6 is a sectional view taken along line 6—6 of FIG. 2;

FIG. 7 is a partial sectional view of a power press provided with the present invention;

FIG. 8 is a partial sectional end view of FIG. 7;

FIG. 9 is a partial top plan view of the die assembly;

FIG. 10 is a bottom plan view of a forming punch assembly;

FIG. 11 is a side elevational view of a forming punch used with the present invention;

FIG. 12 is another side elevational view of the forming punch illustrated in FIG. 11;

FIG. 13 is a front elevational view of the forming punch illustrated in FIG. 11;

FIG. 14 is an exploded perspective view of a forming punch comprised of a plurality of parts;

FIG. 15 is a top plan view of the die;

FIG. 16 is a view similar to FIG. 15 but shows a different die;

FIG. 17 is a sectional view taken along line 17—17 of FIG. 16.

DETAILED DESCRIPTION OF THE INVENTION

Referring now to the drawings, wherein like reference numerals indicate like parts throughout the several views, there is illustrated a stitch plate or throat plate 10. The illustrated throat plate is one that finds use with flat bed sewing machines but it will be appreciated that the teachings herein advanced are equally applicable to other throat plates as well. Suffice it to say, the throat plate 10 is a generally planar body having apertures 12 permitting attachment of the throat plate to a machine bed, a stitch forming area 14 and appropriate feed dog slots 16.

The present invention is primarily concerned with the formation of the stitch forming area 14. As best illustrated in FIG. 2, the stitch forming area of the throat plate includes one or more needle holes 18 permitting endwise reciprocation of one or more needles (not shown) through the plate, one or more stitch forming fingers 20, and two or more thread slots 22 extending from the needle holes 18. As is appreciated, the stitch forming fingers are extremely important to the overall performance of the sewing machine. Although the configuration of the stitch forming fingers may take a variety of profiles it is consistency and dimensional accuracy between parts which is important to assure maximum performance of the sewing machine. As illustrated in FIGS. 3, 4, or 5, respectfully, the stitch fingers or tongues may depend from one planar surface of the blank at a premeasured angular constant, or have an arcuate configuration or be represented by two inversely related curves. The form or configuration of the stitch tongue is determined by the desired stitch appearance. The desired stitch length is also a determining factor in the formation of the stitch tongue. That is, the length of the stitch tongue, defined by the distance between the needle center line generally indicated as 21 and the stitch tongue's distal end, also contributes to the stitch appearance and length. Because the stitch tongue and associated structure is such a critical area in the overall performance of the sewing machine and development of a satisfactory stitch, the present invention describes a unique method and apparatus for forming same.

The following describes one method of forming the stitch forming area of a sewing machine throat plate. First, the apertures or screw holes 12 are provided in a throat plate blank 24. As illustrated in FIGS. 7 and 8, the blank is then located in a power press 26. The power press employed for this operation must be capable of developing progressively increasing pressures up to a limit approximating 25 tons. An Enterpac power press, model IPE-2560 is one example of this type of press. The blank 24 is located in the press between a cooperatively arranged punch 28 and die 30 defining a die or set assembly 32. The blank is positioned in the press by fitting the apertured plate or blank 24 over two non load bearing projecting pins 34 carried by the lower press platen 36. Having situated the blank in the press, the forming punch 28, which in the preferred embodiment is carried by the press ram 38, (FIG. 8) is then urged toward the die 30 whereby squeezing or swaging the blank therebetween. The forming punch 28 having a mirror image of the stitch tongue profile, is urged against one planar face of the throat plate blank with progressively increasing levels of pressure eventually exceeding the yield strength of the blank material and ultimately resulting is a plastic flow of material. When the forming punch 28 penetrates the blank, material flows around the form of the punch. This causes reorientation and elongation of the grains in the direction of the deformation forces whereby increasing the strength of the stitch tongue. That is, the grain structure assumes a direction of flow extending generally parallel with the profile of the forming punch thus creating less end grain which, of course, adds to the strength of the stitch tongue.

In the initial stages of the swaging process, and as a result of the forming punch's pressing action on one planar face of the blank, material is displaced from the blank's opposite face. The material that is displaced from the opposite planar face of the blank is restrained in a predetermined unique manner to form a displaced area having a stepped configuration. That is, all of the displaced material on the face of the blank opposite the forming punch flows or is urged into a specifically configured cavity 40 provided in the die 30. As described below, pressure points within the cavity 40 act on the plastically deformed material to control its flow whereby aiding in the formation of the stitch tongue and avoiding die break or fracturing of the material along its edges during the swaging process. The material initially displaced into the cavity also serves to lock or prevent sideways shifting of the blank relative to the die assembly 32. Because the blank is initially locked against movement, accurate and consistant location or placement of the stitch tongue profile relative to the screw holes 12 is achieved. Also, initial locking of the plate against movement avoids shearing of the pins 34 over which the blank is fitted.

The progressive urging of the forming punch against the blank continues until a positive stop occurs between the face of the punch platen 42 carrying the forming punch 28 and the upper planar face of the blank. Because a positive stop is provided a concise stitch tongue profile will be impressed in the blank regardless of the blank's thickness. As a result of this cold forming process, the metal is forced to flow into all the interstices of the forming punch and a mirror image thereof is impressed into the throat plate blank. In the ultimate stages of the forming process, the punch and the die cooperate to normalize the stress points around the extrusion whereby aiding in preventing warpage of the plate. Having once removed the plate from the press, a guage or other measuring means can be used to determine the preciseness of the stitch tongue profile. In this manner, the configuration of the stitch tongue profile can be precisely measured before extensive operations are performed on the plate.

Having once impressed the stitch tongue profile into the throat plate blank, the blank is then restored or returned to its generally planar condition. That is, the displaced material including the stepped configuration which was urged into the cavity is removed. In this same operation, the plate is sized to a predetermined dimension. It may be desirous, depending on the throat plate material chosen, to anneal the blank prior to removing the displaced material. The annealing process sufficing to soften those areas work-hardened by the cold forming process. Having once returned the blank to its generally planar configuration, the plate is then turned over and sized a second time to another predetermined dimension.

After sizing the plate the second time, the required number and appropriately sized needle holes or openings 18 and thread slots 22 are machined or formed in the blank in the area of the stitch tongues. Thus, the stitch forming area of the sewing machine throat plate has been completed.

Other advantages may also be acquired by using this method of machining the stitch forming area. As best illustrated in FIG. 6, the underside of the flatbed throat plate is provided with a clearance. This clearance is generally indicated by reference numeral 40 in FIG. 6. This clearance allows for proper formation of the stitch triangle during the stitch forming process. To machine this area on hard steels, usually used for throat plates, results in expensive tool wear. Also, the rotary cutter normally used to provide this clearance does not always provide sufficient clearance thus further hand operations are required to accomplish the desired results. With the present invention, however, this area may be completely formed during the swaging process whereby providing a smooth surface finish and eliminating further machining and/or hand operation. Forming this area during the cold forming process, also provides, if desired, maximum clearance across the entire width of the stitch forming area, a result unobtainable by using a rotary cutter, whereby the ultimate in sewing performance can be accomplished.

As mentioned, the die assembly 32 used in the above described method includes a forming punch 28 and a die 30. The forming punch 28, depending on the profile of the stitch tongue, may be of unitary construction or be an assemblage of a plurality of elements. For example, a forming punch capable of providing a stitch tongue profile having a constant angular orientation as seen in FIG. 3, may be of unitary construction. In contrast, and as best seen in FIG. 14, a forming punch used for impressing a curved stitch tongue profile, as seen in FIGS. 4 or 5, or one wherein increased thread handling room may be required on the underside of the plate, may be comprised of two or more complementary elements 29 and 31. It is also possible to form or mold the punch and the die from a carbide type material whereby further extending the punch and die life. Operator controlled workpiece removal 61 including ejection pin means 63 are provided to remove the throat plate blank from between the die assembly 32.

Turning again to FIGS. 7 and 8, regardless of the die's construction, the forming punch of the present invention is removably secured in a cavity 44 formed in the punch platen 42. As additionally seen in FIGS. 11 through 13, the forming punch is comprised of a punch block 46 having a forming section 48 projecting from one end and a sideways projecting key or lip 50 formed at the opposite end. The forming section 48 includes a shearing surface 49 and a stitch tongue profile surface 51 that extends away from the furface 49 and has a mirror image of the desiredstitch tongue profile. The key or lip 50 coacts with a key way 52 formed in the punch platen 42 and serves to removably secure the punch against endwise movement. The key 50 also prevents erroneous insertion of the punch 28 into its platen. As mentioned above, the forming section of the punch has a profile corresponding to a mirror image of the desired stitch tongue profile. Depending on the desired result, the forming section of the punch may also include an angular offset section 54 which may be formed as part of the punch or as a separate piece (FIG. 14). In either the unitary or multiple piece construction, the angular offset portion preferably extends the width of the forming punch. In the swaging process, this offset portion forms the angular surface 40 on the blank whereby providing additional thread clearance in the blank.

The end surfaces 55 surrounding the forming section 48 are beveled away from the forming section in a generally diamond configuration. Each bevel extends away from a high point, indicated at 58 in FIGS. 11-13 whereat the punch block and forming section meet, to a peripheral low point indicated at 60. When assembled in the punch platen, the low point on the bevel meets with the exposed planar face of the punch platen 42. The total amount of slope approximates 0.004" to 0.007". The forming punch is so designed that, in addition to the impression left by the forming section, a diamond configuration surrounding the impressed stitch tongue profile is impressed into the stamped blank in the ultimate stages of the swaging process. This impression relieves the bending stresses created during the swaging process whereby aiding in preventing warpage of the blank.

Preferably, the stationary die 30 is of unitary construction and is removably secured in the stationary die platen 36 of the press. As seen in FIG. 8, the die 30 is comprised of a die block 76 having a sideways projecting key or lip 78. The key 78 coacts with a key way 80 formed in the die platen 80 and serves to removably secure the die against endwise movement. As with the punch, the key 78 prevents erroneous insertion of the die 30 into its die platen. The die 30 includes a centrally arranged stepped cavity or opening 40 that cooperates with the forming punch in formation of the stitch tongue. Configuration of the die cavity depends on the stitch tongue being produced but, in general, measures approximately 80% of the surface area of the depending forming section on the forming punch. The cavity in the die serves several purposes; it takes the material displaced during the swaging process; it serves to prevent lateral shifting of the blank during the swaging process and it adds in the formation of the stitch tongue.

As may be best shown in FIGS. 15 and 17, the cavity 40 is formed with a series of steps 64 and 66. The provision of steps in the die cavity is essential to the proper formation of the stitch tongue profile. The steps in the die cavity act as pressure points during the swaging process and without the pressure points, the displaced material may shear and create a die break around the edges of the material. Instead, the pressure points or steps provided by the instant invention holdup and restrain the plastic flow of material whereby preventing fracturing or stress breakage during the forming process and aid in allowing the material to meet the profile of the impressing punch.

During the swaging process, the first step 64 in the cavity 40 serves to hold and prevent lateral shifting of the blank. That is, as the forming punch causes displacement of material along the bottom surface of the plate, the displaced material begins to fill the area defined by the step 64. The material displaced into this step portion has a "dowelling effect" which holds the part in place and prevents lateral displacement of same. As is appreciated, the step 64 prevents the plate from shifting in three directions. The shearing face 49 (FIGS. 11 & 13) on the forming punch 28, once impressed into the blank during the swaging process, prevents the plate from shifting in the fourth direction. Thus, the plate is prevented from shifting in any lateral direction during the cold forming process. Once the displaced material fills the void defined by the first step 64, and with increasing pressure from above, the material's plastic deformation eventually overcomes the resistence offered by the first step or pressure point. Having overcome the resistance offered by the first step, the material then flows into the second step 66 of the cavity 40. Even as the plastically deformed material flows past the pressure point 64, resistence to the flow will be presented so as to allow formation of the stitch tongue profile.

As mentioned above, configuration of the bottom die cavity includes a number of pressure points or steps depending on the stitch tongue being produced. Although all of the dies used under the teachings of this present invention will incorporate the concept of using pressure points or steps in the cavity, the design of the cavity 40 may vary. As shown in FIG. 16, further relief means or steps may be required. An example of where such a die is required might be a throat plate where the stitch tongue forming punch has two intersecting generally perpendicular walls. In such an instance, further relief means orcuts generally indicated in FIG. 16 by reference numeral 70, may be needed in the cavity to allow proper plastic flow. Without these additional pressure relief means the displaced material may not be properly supported thus resulting in the fracturing of the material. In some instances, a second relief means 72 may be provided to allow adequate support for the displaced material without causing damage to the forming punch during the swaging process. As mentioned, the number of relief means or pressure points required is a function of the intricacies of the punch used in forming the stitch tongue profile.

Regardless of the number of relief means provided, the exposed end of the die 30 is provided with beveled edges 83 (FIG. 9) similar to those provided on the punch 28. That is, a series of four beveled edges extend away from the cavity formed in the die. Each bevel extends away from a high point, indicated at 84 to a peripheral low point indicated at 86. When assembled in the die platen, the lower point 86 meets with the exposed planar face of the die platen 36. The total amount of slope approximates 0.004" to 0.007". Again, as with the punch 28, the die is so designed such that a diamond configuration is impressed into the blank in the ultimate stages of the swaging process. This impression, along with that impression left by the punch 28 serves to relieve the bending stresses creating during the swaging process whereby aiding and preventing warpage of the blank.

As best seen in FIGS. 7 through 10, and as mentioned above, the method used for forming the stitch tongue profile requires high pressures. To maintain a constant sliding cooperative relationship between the punch and the die, in addition to the normal means 90 additional guide means 92 have been provided. The guide means 92 comprise a series of generally L-shaped supports 94 which are provided at each corner of the die platen 36. The guide means 94 extend upwardly above the die platen and define an area into which the punch platen 42 is adapted to be fitted. In operation, when the forming punch is urged toward the die, the punch platen carrying same cooperates with the guide means to guide the punch and die in a constant sliding cooperative relationship relative one another. Thus, the high pressures incurred with the present invention have no adverse effect concerning the relationship between the punch and die.

Thus it is apparent that there has been provided, in accordance with the invention, a Method And Apparatus For Forming The Stitch Forming Area Of A Sewing Machine Throat Plate that fully satisfies the objects, aims, and advantages set forth above. While the invention has been described in conjunction with specific embodiments thereof, it is evident that may alternatives, modifications, and variations will be apparent to those skilled in the art in light of the foregoing description. Accordingly, it is intended to embrace all such alternatives, modifications, and variations as fall within the spirit and broad scope of the appended claims.

Thus having adequately described the present invention, what we claim is:

1. Method of forming the stitch forming area of a sewing machine throat plate comprising the steps of:
   progressively pressing a contoured forming punch against one side of a planar throat plate blank with increasing pressure until the punch platen contacts the planar face of the blank, the pressing action creating a plastic flow of material resulting in formation of a stitch tongue having the contour of the forming punch;
   controlling material displacement on the other side of said throat plate blank into a stepped cavity formed in a die to form a displaced area having a stepped configuration;
   removing the displaced material including the stepped configuration from the other side of said plate and sizing the blank to its proper thickness; and forming appropriately sized thread slots and needle openings in the blank in the area of the stitch tongue.

2. A method of forming the stitch forming area of a sewing machine throat plate comprising the steps of:
pressure swaging a throat plate stitch tongue by pressing a punch capable of forming the stitch tongue profile against one face of a planar throat plate blank with increasing pressure until the punch platen contacts and the punch marks said throat plate blank face;
controlling the displacement of material occuring during the pressure swaging process to allow controlled formation of the stitch tongue profile while allowing excessive displaced material to flow in a predetermined manner from the other side of said blank into a cooperatively arranged stepped die to form a displaced area having a stepped configuration;
removing the excess material including the stepped configuration from said other side of the throat plate blank to return the blank to its planar form;
sizing the throat plate; and
forming the required needle holes and thread slots in the blank in the stitch tongue area.

3. A method for forming the stitch forming area on a sewing machine throat plate, comprising:
forming a stitch tongue by penetrating a located, generally planar throat plate blank having upper and lower faces with a forming punch to permanently displace material from said upper and lower faces so that a mirror image of the punch is produced on one face of the blank and displacement of material from the other face is controlled with a stepped die to form a displaced area having a stepped configuration with the displaced material and stepped die combining to anchor said plate against lateral movement;
restoring said blank to a generally planar condition by removing the displaced material including the stepped configuration from said other face of the blank; and
machining the required needle holes and thread slots in the blank in the area of the stitch tongue.

4. A method of providing a sewing machine throat plate with a stitch forming area comprising the steps of:
impressing the design of a punch in a planar face of a generally planar throat plate blank at a predetermined distance from a locating hole provided in said blank whereby establishing a stitch tongue profile in the blank;
constraining material urged from the other planar face of said blank in a predetermined manner with a stepped cavity provided in a lower die during the impressing process whereby forming a displaced area having a stepped configuration, the displaced material and cavity combining to secure said plate against lateral shifting;
annealing the throat plate blank;
removing the material including the stepped configuration displaced from said other planar face of said blank whereby returning the blank to its planar state; and
providing the required number of needle holes and thread slots in the blank in the area of the stitch tongue.

5. Method of producing the stitch forming area of a sewing machine throat plate comprising the steps of:
cold forming a throat plate stitch tongue profile on one side of a throat plate blank while controlling the material displacement on the opposite side of said blank with a die having a stepped cavity whereby forming a displaced area having a stepped configuration;
removing the material including the stepped configuration displaced from the opposite side of the blank during the cold forming process;
sizing the throat plate blank to a predetermined thickness; and
machining the required number of needle holes and thread slots in the stitch tongue area.

6. Method or producing the stitch forming area of a sewing machine throat plate comprising the steps of:
pressing a forming punch having a stitch tongue profile against a throat plate blank with a pressure exceeding the yield strength of the blank whereby causing plastic disformation of the blank material into the interstices of the punch thereby forming the stitch tongue with excessive displaced material flowing in a controlled manner into a stepped cavity formed in a cooperatively arranged die to form a displaced area having a stepped configuration;
sizing the throat plate blank to a predetermined thickness including removing the stepped configuration formed during the pressing process; and
forming the required number of needle holes and thread slots in the stitch tongue area.

* * * * *